(12) United States Patent
Vasthimal et al.

(10) Patent No.: US 11,086,963 B2
(45) Date of Patent: Aug. 10, 2021

(54) ADAPTIVE DATA PLATFORMS

(71) Applicant: eBay Inc., San Jose, CA (US)

(72) Inventors: Deepak Kumar Vasthimal, San Jose, CA (US); Pavan Kumar Srirama, San Jose, CA (US); Arun Kumar Akkinapalli, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/210,845

(22) Filed: Dec. 5, 2018

(65) Prior Publication Data
US 2020/0183988 A1 Jun. 11, 2020

(51) Int. Cl.
*G06F 17/00* (2019.01)
*G06F 16/958* (2019.01)
(Continued)

(52) U.S. Cl.
CPC ............ *G06F 16/958* (2019.01); *G06F 1/163* (2013.01); *G06F 3/167* (2013.01); *G06F 9/451* (2018.02);
(Continued)

(58) Field of Classification Search
CPC .... G06F 3/04842; G06F 3/04847; G06F 3/01; G06F 3/167; G06F 9/451; G06F 11/3692;
(Continued)

(56) References Cited

U.S. PATENT DOCUMENTS 6,477,575 B1  11/2002  Koeppel et al.
6,493,754 B1  12/2002  Rosborough et al.
(Continued)

FOREIGN PATENT DOCUMENTS

KR   10-2018-0126452 A   11/2018
WO   2020/117318 A1     6/2020

OTHER PUBLICATIONS

HiConversion, "Adaptive A B Testing", [Online]. Retrieved from the Internet URL: https: www.hiconversion.comadaptive-ab-testing, (Feb. 19, 2019), 7 pages.
(Continued)

*Primary Examiner* — Andrew T McIntosh
(74) *Attorney, Agent, or Firm* — FIG. 1 Patents

(57) ABSTRACT

An experimentation platform controls testing of features by an application server. Based on a user identifier, the experimentation platform determines which feature should be provided, and the application server provides the corresponding version of a user interface. If the user behavior data shows that using a tested feature results in an improvement, the tested feature will be adopted. To determine whether or not an improvement is observed, a statistically significant amount of data is gathered. The experimentation platform gathers data regarding user behavior for the feature versions and, in response, adjusts the frequency at which each version is served. Providing the proposed version to an increased percentage of users decreases the total number of page serves required to gather statistically significant data. The experimentation platform may provide an updated projected time to completion of testing based on the changed percentage of users receiving the proposed version.

20 Claims, 13 Drawing Sheets

(51) Int. Cl.
*G06F 9/451* (2018.01)
*G06F 11/34* (2006.01)
*G06N 20/00* (2019.01)
*G06F 3/16* (2006.01)
*G06F 1/16* (2006.01)

(52) U.S. Cl.
CPC ...... *G06F 11/3419* (2013.01); *G06F 11/3438* (2013.01); *G06F 11/3452* (2013.01); *G06N 20/00* (2019.01)

(58) Field of Classification Search
CPC ............... G06F 16/958; G06F 11/3438; G06F 11/3419; G06F 1/163; G06F 11/3452; G06F 11/3447; G06F 2201/86; G06F 2201/88; G06F 8/38; H04N 21/4532; G06N 20/00
See application file for complete search history.

(56) References Cited

U.S. PATENT DOCUMENTS

| | | | |
|---|---|---|---|
| 6,907,546 | B1 | 6/2005 | Haswell et al. |
| 7,154,497 | B2 | 12/2006 | Allor |
| 7,159,206 | B1 | 1/2007 | Sadhu et al. |
| 7,165,088 | B2 | 1/2007 | Cohen et al. |
| 7,593,928 | B2 | 9/2009 | Canon et al. |
| 7,653,688 | B2 | 1/2010 | Bittner |
| 7,673,288 | B1 | 3/2010 | Stroomer |
| 7,680,858 | B2 | 3/2010 | Poola et al. |
| 7,966,564 | B2 | 6/2011 | Catlin et al. |
| 7,975,000 | B2 | 7/2011 | Dixon et al. |
| 7,992,133 | B1 | 8/2011 | Theroux et al. |
| 8,321,935 | B1 | 11/2012 | Chen et al. |
| 8,332,408 | B1 | 12/2012 | Rudary |
| 8,429,616 | B2 | 4/2013 | Sahni et al. |
| 8,444,420 | B2 | 5/2013 | Scott |
| 8,713,103 | B2 | 4/2014 | Ramakumar et al. |
| 8,789,019 | B2 | 7/2014 | Sahni et al. |
| 9,262,543 | B2 | 2/2016 | Sahni et al. |
| 9,471,941 | B2 | 10/2016 | Ramakumar et al. |
| 9,703,685 | B2 | 7/2017 | Sahni et al. |
| 10,268,569 | B2 | 4/2019 | Sahni et al. |
| 10,599,557 | B2 | 3/2020 | Sahni et al. |
| 10,983,900 | B2 | 4/2021 | Sahni et al. |
| 2002/0156668 | A1 | 10/2002 | Morrow et al. |
| 2003/0014503 | A1 | 1/2003 | Legout et al. |
| 2003/0144898 | A1 | 7/2003 | Bibelnieks et al. |
| 2005/0182933 | A1 | 8/2005 | Ritz et al. |
| 2006/0271671 | A1 | 11/2006 | Hansen |
| 2007/0022058 | A1 | 1/2007 | Labrou et al. |
| 2007/0055663 | A1 | 3/2007 | Hancheroff et al. |
| 2007/0211696 | A1 | 9/2007 | Noble |
| 2007/0220554 | A1 | 9/2007 | Barton et al. |
| 2008/0015880 | A1 | 1/2008 | Freedenberg et al. |
| 2008/0027861 | A1 | 1/2008 | Gendler |
| 2008/0065630 | A1 | 3/2008 | Luo et al. |
| 2008/0066056 | A1 | 3/2008 | Inoue |
| 2008/0140765 | A1 | 6/2008 | Kelaita et al. |
| 2008/0275980 | A1 | 11/2008 | Hansen |
| 2009/0182770 | A1 | 7/2009 | Madhavan |
| 2009/0183084 | A1 | 7/2009 | Robertson |
| 2009/0192783 | A1 | 7/2009 | Jurach |
| 2009/0282343 | A1 | 11/2009 | Catlin et al. |
| 2010/0082690 | A1 | 4/2010 | Kenigsberg et al. |
| 2010/0095197 | A1 | 4/2010 | Klevenz et al. |
| 2010/0121718 | A1 | 5/2010 | Alandietz |
| 2010/0145762 | A1 | 6/2010 | Coladonato et al. |
| 2010/0174603 | A1 | 7/2010 | Hughes et al. |
| 2010/0229150 | A1 | 9/2010 | Stone et al. |
| 2010/0262471 | A1 | 10/2010 | Hughes |
| 2011/0196821 | A1* | 8/2011 | Hellerman ............ G06F 16/958 707/600 |
| 2011/0231821 | A1 | 9/2011 | Sahni et al. |
| 2012/0079374 | A1 | 3/2012 | Gaddis |
| 2012/0102114 | A1 | 4/2012 | Dunn et al. |
| 2012/0159307 | A1 | 6/2012 | Chung et al. |
| 2012/0233312 | A1 | 9/2012 | Ramakumar et al. |
| 2012/0254043 | A1 | 10/2012 | Hughes |
| 2013/0239091 | A1 | 9/2013 | Sahni et al. |
| 2014/0075336 | A1* | 3/2014 | Curtis .................... G06N 20/00 715/753 |
| 2014/0214483 | A1* | 7/2014 | Minnis ............... G06Q 30/0244 705/7.29 |
| 2014/0236783 | A1 | 8/2014 | Ramakumar et al. |
| 2014/0236875 | A1 | 8/2014 | Phillipps et al. |
| 2014/0297795 | A1 | 10/2014 | Sahni et al. |
| 2016/0162390 | A1 | 6/2016 | Sahni et al. |
| 2016/0259501 | A1* | 9/2016 | Nagarajan ............... G06F 9/451 |
| 2016/0306506 | A1 | 10/2016 | Curtis et al. |
| 2017/0124487 | A1 | 5/2017 | Szeto et al. |
| 2017/0193403 | A1* | 7/2017 | Iscoe .................... G06N 3/086 |
| 2017/0308459 | A1 | 10/2017 | Sahni et al. |
| 2018/0253408 | A1 | 9/2018 | Severn |
| 2019/0196941 | A1 | 6/2019 | Sahni et al. |
| 2020/0005310 | A1* | 1/2020 | Kumar ................. G06K 9/6223 |
| 2020/0174913 | A1 | 6/2020 | Sahni et al. |

OTHER PUBLICATIONS

Kalbach, "Web Page Layout: A Comparison Between Left- and Right-justified Site Navigation Menus", Journal of Digital Information, vol. 4, No. 1 (2003), 8 pages.
Vasthimal, "Scalable and Adaptive A B Test Data Platform", (Dec. 10-12, 2018), 10 pages.
Notice of Allowance received for U.S. Appl. No. 12/728,067, dated Dec. 24, 2012, 19 pages.
Final Office Action received for U.S. Appl. No. 13/045,372, dated Sep. 9, 2013, 9 pages.
Non-Final Office Action received for U.S. Appl. No. 13/045,372, dated Apr. 10, 2013, 7 pages.
Non-Final Office Action received for U.S. Appl. No. 13/045,372, dated Sep. 7, 2012, 5 pages.
Notice of Allowance received for U.S. Appl. No. 13/045,372, dated Dec. 18, 2013, 10 pages.
Response to Final Office Action filed Nov. 20, 2013 for U.S. Appl. No. 13/045,372, dated Sep. 9, 2013, 23 pages.
Response to Non-Final Office Action filed Aug. 12, 2013, for U.S. Appl. No. 13/045,372, dated Apr. 10, 2013, 10 pages.
Response to Non-Final Office Action filed Jan. 7, 2013, for U.S. Appl. No. 13/045,372, dated Sep. 7, 2012, 9 pages.
Non-Final Office Action received for U.S. Appl. No. 13/867,203, dated Dec. 19, 2013, 8 pages.
Notice of Allowance received for U.S. Appl. No. 13/867,203, dated Mar. 14, 2014, 16 pages.
Response to Non-Final Office Action filed Jan. 23, 2014, for U.S. Appl. No. 13/867,203, dated Dec. 19, 2013, 16 pages.
Final Office Action received for U.S. Appl. No. 14/263,528, dated Jul. 16, 2015, 10 pages.
Non-Final Office Action received for U.S. Appl. No. 14/263,528, dated Aug. 29, 2014, 7 pages.
Non-Final Office Action received for U.S. Appl. No. 14/263,528, dated Dec. 22, 2014, 10 pages.
Non-Final Office Action received for U.S. Appl. No. 14/263,528, dated Feb. 1, 2016, 4 pages.
Notice of Allowance received for U.S. Appl. No. 14/263,528, dated Jun. 16, 2016, 10 pages.
Preliminary Amendment filed for U.S. Appl. No. 14/263,528, dated Jun. 23, 2014, 7 pages.
Response to Final Office Action filed Dec. 16, 2015 for U.S. Appl. No. 14/263,528, dated Jul. 16, 2015, 12 pages.
Response to Non-Final Office Action filed Apr. 14, 2015, for U.S. Appl. No. 14/263,528, dated Dec. 22, 2014, 11 pages.
Response to Non-Final Office Action filed May 2, 2016, for U.S. Appl. No. 14/263,528, dated Feb. 1, 2016, 8 pages.
Response to Non-Final Office Action filed Sep. 15, 2014, for U.S. Appl. No. 14/263,528, dated Aug. 29, 2014, 9 pages.
Non-Final Office Action received for U.S. Appl. No. 14/301,280, dated May 7, 2015, 16 pages.

(56) References Cited

OTHER PUBLICATIONS

Notice of Allowance received for U.S. Appl. No. 14/301,280, dated Oct. 13, 2015, 12 pages.
Preliminary Amendment received for U.S. Appl. No. 14/301,280, dated Jul. 9, 2014, 9 pages.
Response to Non-Final Office Action filed Sep. 8, 2015, for U.S. Appl. No. 14/301,280 dated May 7, 2015, 9 pages.
Non-Final Office Action received for U.S. Appl. No. 15/043,873, dated Sep. 22, 2016, 13 pages.
Notice of Allowance received for U.S. Appl. No. 15/043,873, dated Mar. 10, 2017, 9 pages.
Preliminary Amendment received for U.S. Appl. No. 15/043,873, dated Jul. 28, 2016, 7 pages.
Response to Non-Final Office Action filed Jan. 23, 2017, for U.S. Appl. No. 15/043,873, dated Sep. 22, 2016, 12 pages.
Non-Final Office Action received for U.S. Appl. No. 15/644,626, dated Aug. 7, 2018, 12 pages.
Notice of Allowance received for U.S. Appl. No. 15/644,626, dated Dec. 12, 2018, 8 pages.
Preliminary Amendment received for U.S. Appl. No. 15/644,626, dated Jul. 31, 2017, 7 pages.
Response to Non-Final Office Action filed Nov. 2, 2018, for U.S. Appl. No. 15/644,626, dated Aug. 7, 2018, 11 pages.
Non-Final Office Action Received for U.S. Appl. No. 16/292,804, dated Aug. 27, 2019, 12 pages.
Notice of Allowance received for U.S. Appl. No. 16/292,804, dated Nov. 14, 2019, 8 pages.
Response to Non-Final Office Action filed Oct. 24, 2019, for U.S. Appl. No. 16/292,804, dated Aug. 27, 2019, 11 pages.
Non-Final Office Action Received for U.S. Appl. No. 16/784,648, dated Aug. 28, 2020, 13 pages.
Response to Non-Final Office Action filed Nov. 4, 2020 for U.S. Appl. No. 16/784,648, dated Aug. 28, 2020, 11 pages.
International Search Report received for PCT Application No. PCT/US2019/040291, dated Nov. 14, 2019, 3 pages.
International Written Opinion received for PCT Application No. PCT/US2019/040291, dated Nov. 14, 2019, 5 pages.
Notice of Allowance received for U.S. Appl. No. 16/784,648, dated Dec. 16, 2020, 8 pages.
Corrected Notice of Allowability Received for U.S. Appl. No. 16/784,648, dated Mar. 24, 2021, 2 Pages.

* cited by examiner

SESSION TABLE 300

| | GUID | SESSION ID | EVENT COUNT | SESSION START | SESSION END | DEVICE INFO |
|---|---|---|---|---|---|---|
| 330A | 1001 | 9001 | 2 | 11/12/18 1:23:45 | 11/12/18 1:53:50 | IE |
| 330B | 1003 | 9002 | 237 | 11/12/18 1:23:49 | 11/13/18 1:23:49 | AMD |
| 330C | 1004 | 9003 | 5 | 11/12/18 1:23:53 | 11/12/18 2:23:53 | WINDOWS |
| 330D | 1005 | 9004 | 12 | 11/12/18 1:23:59 | 11/12/18 3:33:17 | TABLET |

EXPERIMENT TABLE 340

| | EXPERIMENT ID | VERSION | NAME | TYPE | EXPERIMENT START | EXPERIMENT END | SITE |
|---|---|---|---|---|---|---|---|
| 360A | 5001 | 1.0 | BLUE BUTTON | 1 | 11/12/18 0:00:00 | 11/19/18 7:33:27 | HOME |
| 360B | 5002 | 1.1 | DOUBLE CONFIRM | 2 | 11/17/18 0:00:00 | 11/27/18 8:54:00 | SHOP |
| 360C | 5003 | 2.0 | REORDER | 3 | 11/22/18 0:00:00 | 12/24/18 1:15:35 | REGISTER |

*FIG. 3*

EVENT TABLE — 410

| GUID | SESSION ID | EVENT ID | EVENT TIME |
|---|---|---|---|
| 1001 | 9001 | 501 | 1/12/18 1:23:48 |
| 1001 | 9001 | 502 | 1/12/18 1:23:50 |

420, 430A, 430B

AUTOMATIC EXPERIMENT CONFIGURATION TABLE — 440

| ELEMENT TYPE | ATTRIBUTE TYPE | ATTRIBUTE VALUE |
|---|---|---|
| BUTTON | SIZE | CURRENT +/- 50% |
| BUTTON | COLOR | BLACK, RED, YELLOW |
| BUTTON | POSITION | (CURRENTX, CURRENTY +/- 25) |

ADAPTIVE DATA PLATFORMS

TECHNICAL FIELD

The subject matter disclosed herein generally relates to data platforms. Specifically, in some example embodiments, the present disclosure addresses systems and methods for configuration and management of adaptive data platforms.

BACKGROUND

A/B testing lets diverse sets of users experience different features while measuring the impact of the differences on the users. New ideas for features and interfaces can be tested using small subsets of users and the changes can either be rolled out to all users if the impact is desirable, or testing can be stopped if the impact is negative or negligible.

Each of the different features is served to a percentage of users and testing data is gathered. After sufficient data is gathered to ensure that any observed differences in behavior are statistically significant or that the differences in behavior are insignificant, testing is stopped and one feature is selected for future use.

BRIEF DESCRIPTION OF THE DRAWINGS

Some embodiments are illustrated by way of example and not limitation in the figures of the accompanying drawings.

FIGS. 3-4 are a block diagram illustrating a database schema suitable for implementing an adaptive data platform, according to some example embodiments.

FIG. 4 is a flow diagram illustrating operations by a first node of a replicated key-value store in a method of using a free world replication protocol, according to some example embodiments.

DETAILED DESCRIPTION

Figure 1:
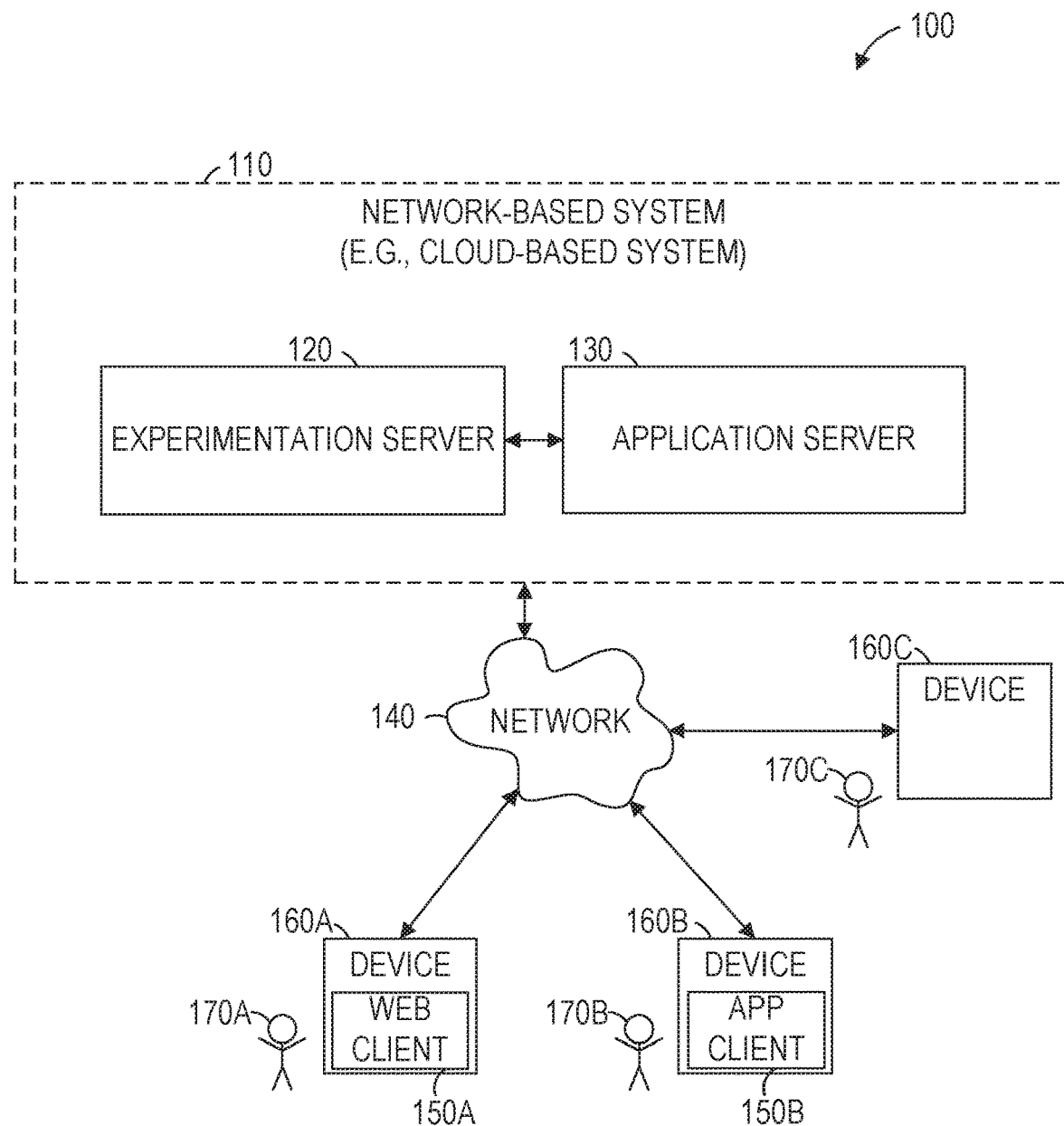
FIG. 1 is a network diagram illustrating a network environment suitable for implementing an adaptive data platform, according to some example embodiments.

Example methods and systems are directed to adaptive data platforms. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An experimentation platform (e.g., an experimentation server) can control A/B testing of features by an application server. Example features include page flow and page configuration. For example, in one page flow, clicking a checkout button takes a user to a page showing cart contents; in another page flow, clicking the checkout button takes the user to a page requesting credit card information. As another example, in one page configuration, a button has a certain size; in another page configuration, the button has a larger size.

Each request for a page from the application server is associated with a user identifier. Example user identifiers include Internet protocol (IP) addresses and account identifiers. Based on the user identifier, the experimentation platform determines which feature should be provided on the page and the application server provides the corresponding version of the page.

Typically, one version is the current version and another version is a proposed version. If the user behavior data shows that using the proposed version instead of the current version results in an improvement (e.g., increased user engagement, increased sales, increased advertising revenue, decreased complaints, decreased returns, or any suitable combination thereof), the proposed version will be adopted and replace the current version. To determine whether or not an improvement is observed, a statistically significant amount of data is gathered.

The experimentation platform gathers data regarding user behavior for the feature versions and, in response, adjusts the frequency at which each version is served. For example, a proposed version is initially served to 10% of users and a current version is initially served to 90% of users. After the first 100 users receive the proposed version, the resulting data indicates a 10% increased chance of sales when compared to the current version. As a result, the experimentation platform increases the percentage of users receiving the proposed version. Providing the proposed version to an increased percentage of users decreases the total number of page serves required to gather statistically significant data. The experimentation platform may provide an updated projected time to completion of A/B testing based on the changed percentage of users receiving the proposed version.

An administrator may provide the experimentation platform an identity of an element of a user interface and an attribute of the user interface. In response, the experimentation platform automatically determines a first value and a second value for the attribute and performs A/B testing using the two values of the attribute. After statistically significant results are achieved showing that one value performs better than the other, the better-performing value for the attribute is automatically selected.

Technical problems exist with respect to A/B testing. The systems and methods described herein address these problems by reducing the time to complete testing for features that show early results. As a result of this technical improvement, improved features are more quickly provided to users. Further, the systems and methods described herein automate the process of selecting features and attributes, allowing an experimentation server to continuously attempt to improve an application. More specifically, features may be added to a system to improve technical aspects of a computer, a cluster of computers, or a data center, as described further below.

Computing resources may be saved by using the systems and methods described herein, which is a further technical improvement. Examples of such computing resources include processor cycles, network traffic, memory usage, data storage capacity, power consumption, and cooling capacity. As just one example, by avoiding a requirement for an administrator to provide details for every attribute and feature to test, systems and methods may avoid processor cycles, memory usage, network bandwidth or other computing resources associated with improving applications. As a second example, if a first feature is compared to a second feature, a first feature may be selected based on the impact it has on performance of a system, network bandwidth, memory consumption, power consumption, cooling required, etc. In other words, technical and/or economic considerations may be used to select a feature to roll out for wider usage.

FIG. 1 is a network diagram illustrating a network environment 100 suitable for implementing an adaptive data platform, according to some example embodiments. The network environment 100 includes a network-based system 110, a device 160A, a device 160B, and a device 160C all communicatively coupled to each other via a network 140. The devices 160A-160C may be collectively referred to as "devices 160," or generically referred to as a "device 160." The network-based system 110 comprises an experimentation server 120 and an application server 130, communicating via the network 140 or another network. The devices 160 may interact with the network-based system 110 using a web client 150A or an app client 150B. The experimentation server 120, the application server 130, and the devices 160 may each be implemented in a computer system, in whole or in part, as described below with respect to FIG. 2.

The application server 130 provides an application to other machines (e.g., the devices 160) via the network 140. The experimentation server 120 configures the application server 130 to provide two or more different versions of a user interface to different users. The application server 130 may provide the application as a web site. The web client 150A (e.g., a web browser) renders the user interface of the application on a display device of the device 160A. Thus, the different versions of the user interface may be different versions of web pages that are part of a web site.

Each user may be associated with a unique account identifier. In some example embodiments, the experimentation server 120 determines which version of the user interface to present based on the unique account identifier of the user. For example, an even account identifier causes a first version of the user interface to be presented and an odd account identifier causes a second version of the user interface to be presented. As another example, the account identifier may be hashed and the version of the user interface selected based on the hash of the account identifier.

Also shown in FIG. 1 are users 170A, 170B, and 170C that may be referred to generically as "a user 170" or collectively as "users 170." Each user 170 may be a human user (e.g., a human being), a machine user (e.g., a computer configured by a software program to interact with the devices 160 and the network-based system 110), or any suitable combination thereof (e.g., a human assisted by a machine or a machine supervised by a human). The users 170 are not part of the network environment 100 but are each associated with one or more of the devices 160 and may be users of the devices 160 (e.g., the user 170A may be an owner of the device 160A, the user 170B may be an owner of the device 160B, and the user 170C may be an owner of the device 160C). For example, the device 160A may be a desktop computer, a vehicle computer, a tablet computer, a navigational device, a portable media device, or a smartphone belonging to the user 170A.

Responses by the users 170 to the versions of the user interface presented by the application server 130 on the devices 160 are sent from the application server 130 to the experimentation server 120 for analysis. The experimentation server 120 determines which version of the user interface provides better results, as measured by a predetermined metric, and adjusts future presentation of the versions accordingly. For example, the predetermined metric may be clicks, page views, purchases, time spent viewing the user interface, comments posted, ads placed, reviews provided, or any suitable combination thereof. Predetermined metrics may also include computational objectives, such as target performance metrics, memory usage, target network latency, network bandwidth, and the like. Based on one version performing better than another version according to the metric, a percentage of users receiving the better-performing version may be increased and a percentage of users receiving the other version may be decreased. After sufficient responses are received to determine that one version of the user interface performs better than other versions to a statistically significant degree, the experiment may be terminated, causing the better-performing version to be presented to all users thereafter.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource that stores data structured as a text file, a table, a spreadsheet, a relational database (e.g., an object-relational database, a NoSQL database, a network or graph database), a triple store, a hierarchical data store, or any suitable combination thereof. Additionally, data accessed (or stored) via an application programming interface (API) or remote procedure call (RPC) may be considered to be accessed from (or stored to) a database. Moreover, any two or more of the machines, databases, or devices illustrated in FIG. 1 may be combined into a single machine, database, or device, and the functions described herein for any single machine, database, or device may be subdivided among multiple machines, databases, or devices.

The network 140 may be any network that enables communication between or among machines, databases, and devices (e.g., the application server 120 and the devices 160). Accordingly, the network 140 may be a wired network, a wireless network (e.g., a mobile or cellular network), or any suitable combination thereof. The network 140 may include one or more portions that constitute a private network, a public network (e.g., the Internet), or any suitable combination thereof.

Figure 2:
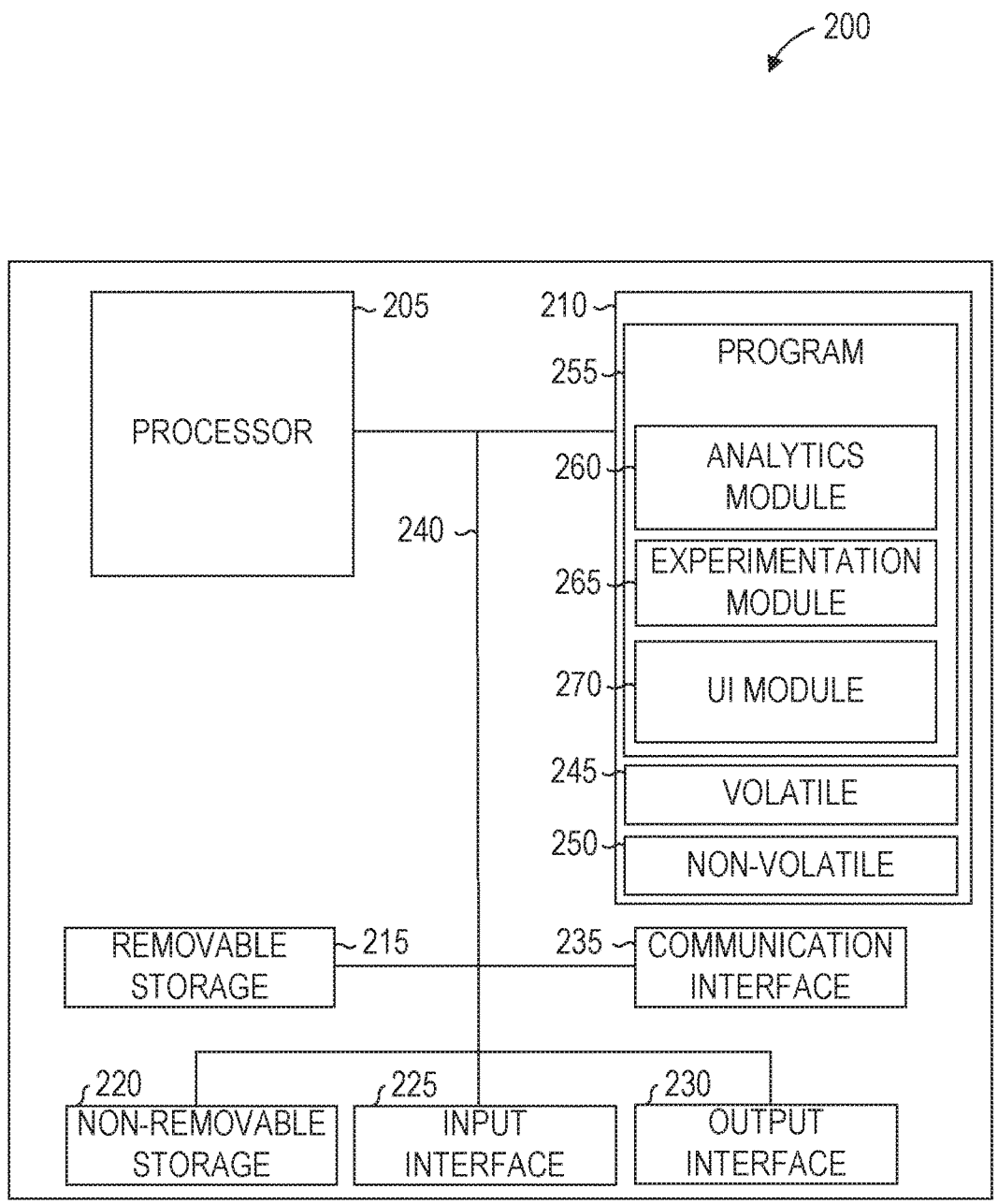
FIG. 2 is a block diagram illustrating components of a computer (e.g., an experimentation server), according to some example embodiments.

FIG. 2 is a block diagram illustrating components of a computer 200 (e.g., the experimentation server 120), according to some example embodiments. All components need not be used in various embodiments. For example, clients, servers, autonomous systems, and cloud-based network resources may each use a different set of components, or, in the case of servers for example, larger storage devices.

One example computing device in the form of the computer 200 (also referred to as a computing device 200 and a computer system 200) may include a processor 205, a computer-storage medium 210, removable storage 215, and non-removable storage 220, all connected by a bus 240. Although the example computing device is illustrated and described as the computer 200, the computing device may be in different forms in different embodiments. For example, the computing device 200 may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The computer-storage medium 210 includes volatile memory 245 and non-volatile memory 250. The volatile memory 245 or the non-volatile memory 250 stores a program 255. The computer 200 may include, or have access to, a computing environment that includes a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 includes or has access to a computing environment that includes an input interface 225, an output interface 230, and a communication interface 235. The output interface 230 interfaces to or includes a display device, such as a touchscreen, that also may serve as an input device. The input interface 225 interfaces to or includes one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-storage medium (e.g., the program 255 stored in the computer-storage medium 210) are executable by the processor 205 of the computer 200. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 255 may further be transmitted or received over the network 140 using a transmission medium via the communication interface 235 and utilizing any one of a number of well-known transfer protocols (e.g., Hypertext Transfer Protocol (HTTP)). Examples of the network 140 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer 200, and includes digital or analog communications signals or other intangible media to facilitate communication of such software.

The program 255 is shown as including an analytics module 260, an experimentation module 265, and a user interface (UI) module 270. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The analytics module 260 of the experimentation server 120 analyses input from users of different versions of a user interface to determine which version performs better according to a predetermined metric. The analytics module 260 of the application server 120 provides the data to the experimentation server 120 and may pre-process the data. For example, the raw user input of clicking on a button or filling out a form may be converted to data representing a purchase being made, an ad being placed, or other higher-level action.

The experimentation module 265 of the experimentation server 120 instructs the application server 130 to provide different versions of a user interface to different users (e.g., based on account identifiers of the users). The experimentation module 265 of the application server 130 receives the instructions from the experimentation server 120 and may request the instructions from the experimentation server 120. For example, when a user with an account identifier requests a user interface with an interface identifier, the user interface having a first version and a second version, the application server 130 sends a request to the experimentation server 120, the request including the account identifier and the interface identifier. In response to the request, the experimentation server 120 provides an identifier of the version of the user interface selected to be provided to the user.

The UI module 270 causes presentation of the selected version of the UI to a user 170. For example, a command-line or graphical interface may be presented in the version selected by the experimentation server 130 for the user 170. In various example embodiments, the UI module 270 is part of an application or part of an operating system. The presented user interface may be presented on a dedicated display device (e.g., a monitor attached to a computer by a display cable) or a display integrated with a computing device (e.g., a screen integrated into a tablet computer, mobile phone, or wearable device). The UI is generally described herein as a graphical user interface, but other types of UIs are contemplated, including a voice interface. For example, a voice interface may receive voice commands, provide audio output, or both.

FIGS. 3-4 are a block diagram illustrating a database schema 300 suitable for implementing an adaptive data platform, according to some example embodiments. The database schema 300 is suitable for use by the application server 130 and the experimentation server 120. The database schema 300 includes a session table 310, an experiment table 340, an event table 410, and an automatic experiment configuration table 440.

The session table 310 is defined by a table definition 320, including a globally unique identifier (GUID) field, a session identifier field, an event count field, a session start field, a session end field, and a device information field. The session table 310 includes rows 330A, 330B, 330C, and 330D. Each of the rows 330A-330D stores information for a session of a client device 160 with an application served by the application server 130. The GUID for each row is a unique identifier for the user of the client device 160. For example, the GUID may be an account identifier for the user. The session identifier is a unique identifier for the session. The session start and session end fields indicate the start and end times of the session. A session that is currently in progress may have a null value for the session end. In some example embodiments, a session is defined as continuous user activity for up to 24 hours (as in the row 330B) or continuous user activity prior to a period of no activity that lasts for 30 minutes. In other example embodiments, other definitions of session are used to group events.

The event count field stores a count of the events that occurred in the session. The definition of an event varies in different example embodiments. In some example embodiments, an event is a click, a right-click, a page view, a purchase, an ad view, placing a comment, or listing an item for sale in an online marketplace. Different types of events may be aggregated as events for the event count field. The device information field stores information about the client device 160 participating in the session. The device information field may store a web browser name, a web browser version, a processor brand, a processor type, an operating system name, an operating system version, a form factor of the client device (e.g., desktop computer, laptop computer, vehicle computer, tablet, phone, or wearable computer), or any suitable combination thereof.

The experiment table 340 is defined by a table definition 350, including an experiment identifier field, a version field, a name field, a type field, an experiment start field, an experiment end field, and a site field. The experiment table 340 includes rows 360A, 360B, and 360C. The experiment identifier and version fields contain the identifier and version number of the experiment. The name field contains the name of the experiment. The experiment start and end fields identify the range of time in which the experiment ran. A currently-running experiment may have an experiment end in the future or with a NULL value. The type field indicates the type of the experiment and may correspond to the element of the user interface being experimented on. The site field indicates the user interface containing the element being modified by the experiment. In some example embodiments, the table definition 320 of the session table 310 includes a field that stores one or more experiment identifiers for each session.

The event table 410 is defined by a table definition 420, including a GUID field, a session identifier field, an event identifier field, and an event time field. Each of the rows 430A and 430B contains data for a single event in the session identified by the session identifier, performed by a user or account corresponding to the GUID, and occurring at the event time. The type of event is identified by the event identifier. The event identifier may identify an element of a user interface that was interacted with. For example, the event identifier 501 may indicate that a particular button of a particular user interface was pressed (e.g., a button 840 of a user interface 800 of FIG. 8). The session identifier in the rows of the event table 410 can be cross-referenced with the session identifier in the rows of the session table 310, allowing the analytics module 260 to process the individual events associated with a session. Thus, in the example of FIGS. 3-4, the rows 430A-430B show additional information for the two events counted in the row 330A.

The automatic experiment configuration table 440 is defined by a table definition 450, including an element type field, an attribute type field, and an attribute value field. The automatic experiment configuration table 440 includes rows 460A, 460B, and 460C. The element type field identifies a type of a user interface element to be experimented on. The attribute type field identifies the attribute of the user interface element to be experimented on. The attribute value field identifies a value, a range of values, or a list of values for the attribute. Thus, the row 460A provides automatic experiment configuration for buttons, allowing the size of the button to be increased or decreased by up to 50% from the current size. The row 460B allows for experiments to be run on buttons by changing a color attribute to black, red, or yellow. The row 460C allows for experiments to be run on buttons by changing the vertical (Y-axis) position of the button by up to 25 pixels in either direction while keeping the horizontal position fixed.

Figure 5:
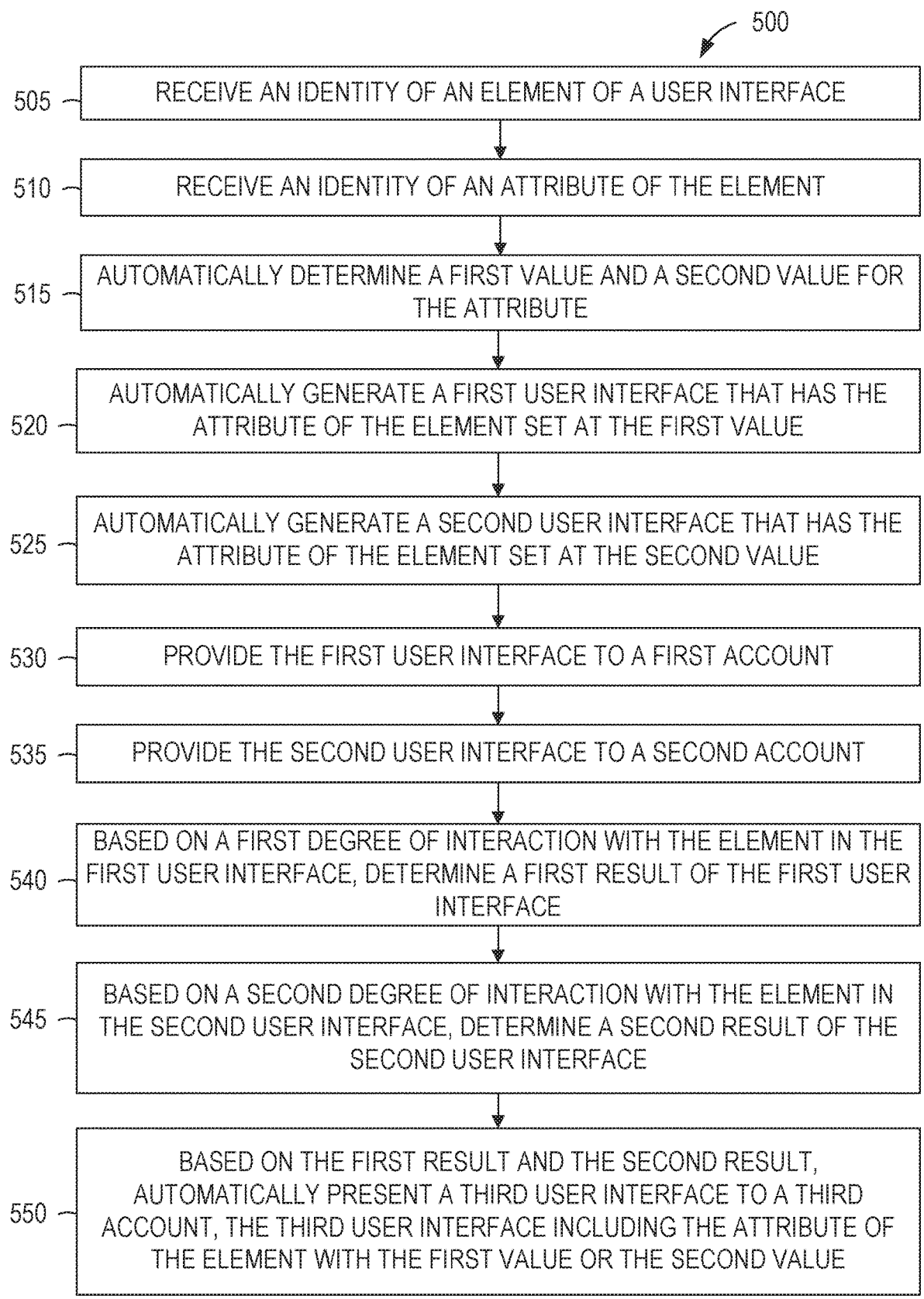
FIG. 5 is a flow diagram illustrating operations by an adaptive data platform in a method of modifying a user interface, according to some example embodiments.

FIG. 5 is a flow diagram illustrating operations by an adaptive data platform in a method 500 of modifying a user interface, according to some example embodiments. The method 500 includes operations 505, 510, 515, 520, 525, 530, 535, 540, 545, and 550. By way of example and not limitation, the method 500 is described as being performed by the systems, modules, and databases of FIGS. 1-4.

In operation 505, the experimentation module 265 receives an identity of an element of a user interface. For example, an administrator selects an element of a user interface using a client device (e.g., the device 160C), causing a unique identifier of the element to be transmitted from the client device to the experimentation server 120 via the network 140. As another example, a control program automatically selects the element of the user interface.

In operation 510, the experimentation module 265 receives an identity of an attribute of the element. For example, the administrator selects the attribute (e.g., from a list of attributes), causing a unique identifier of the attribute to be transmitted to the experimentation server 120. As another example, a control program automatically selects the attribute. The term attribute, as applied to a user interface element, encompasses anything that affects the display or functionality of the user interface element. Example display attributes include size, color, location, shading, shadow, orientation, shape, text contents, image contents, and the like. Example functional attributes include responses by the user interface to interaction with the user interface element. Example interactions include clicking, right-clicking, pressing, long pressing, dragging, dropping another object onto the user interface element, and the like. Example responses include causing the display of a pop-up menu, causing the display of another user interface, causing purchase of an item, and the like.

In operation 515, the experimentation module 265 automatically determines a first value and a second value for the attribute. The first value and the second value may be determined randomly, by a machine learning algorithm, based on a current value of the attribute, based on a predetermined range of the attribute, or any suitable combination thereof. For example, if the user interface element is a button and the attribute is the location of the button, the first value and second value for the attribute may be two different locations of the button, the different locations generated randomly within a region defined by a predetermined threshold and the current location of the button (e.g., the region defined by the row 460C of the automatic experiment configuration table 440), such that the locations are within the predetermined threshold of the current location. In some example embodiments, the first value for the attribute is a current value for the attribute and the second value for the attribute is a proposed change to the current value for the attribute.

The UI module 270, in operation 520, automatically generates a first user interface that has the attribute of the element set as the first value. In operation 525, the UI module 270 automatically generates a second user interface that has the attribute of the element set as the second value. For example, the first user interface has a button at a first location and the second user interface has the button at a second location.

In operations 530 and 535, the UI module 270 provides the first user interface to a first account and the second user interface to a second account. In one embodiment, a determination to provide the first interface to the first account is based on a first account identifier of the first account and a predetermined threshold or range. For example, all account identifiers in the range are provided the first user interface and all account identifiers out of the range are provided the second user interface. In other example embodiments, the determination of which interface to provide are based on a session identifier. Thus, the same account may receive the first user interface in one session and the second user interface in another session. As another alternative embodiment, the request for the user interface indicates which version is to be presented (e.g., by using a different URL for each version).

In operation 540, the experimentation module 265 determines, based on a first degree of interaction with the element in the first user interface, a first result of the first user interface. The result may be a binary success/failure value, a numerical value within a predetermined range, or another result. The degree of interaction may be a binary value (e.g., whether the element was interacted with or not) or a numerical value (e.g., based on a duration of time interacting with the element, based on a number of interactions with the element, based on a price of an item associated with the element if the element was interacted with, or any suitable combination thereof). In operation 545, the experimentation module 265 determines, based on a second degree of interaction with the element in the second user interface, a second result of the second user interface.

Operations 515-545 are described as generating two values for the attribute in two user interfaces for two accounts and determining two results based on two degrees of interaction, but the method 500 may be extended to support an arbitrary number of values for the attribute provided in the same number of user interfaces for the same number of accounts. Thus, more than two different options for the element may be tested simultaneously.

In operation 550, the UI module 270 automatically presents, based on the first result and the second result, a third user interface to a third account, the third user interface including the attribute of the element with the first value or the second value. In some example embodiments, the value of the attribute is selected based on a comparison of the first result with the second result. For example, the value of the attribute providing the best result, according to a predetermined metric, is used in the third user interface. The step 550 may be automatically performed such that a system is self-adaptive and improving a user interface or other aspect of the system continuously.

Figure 6:
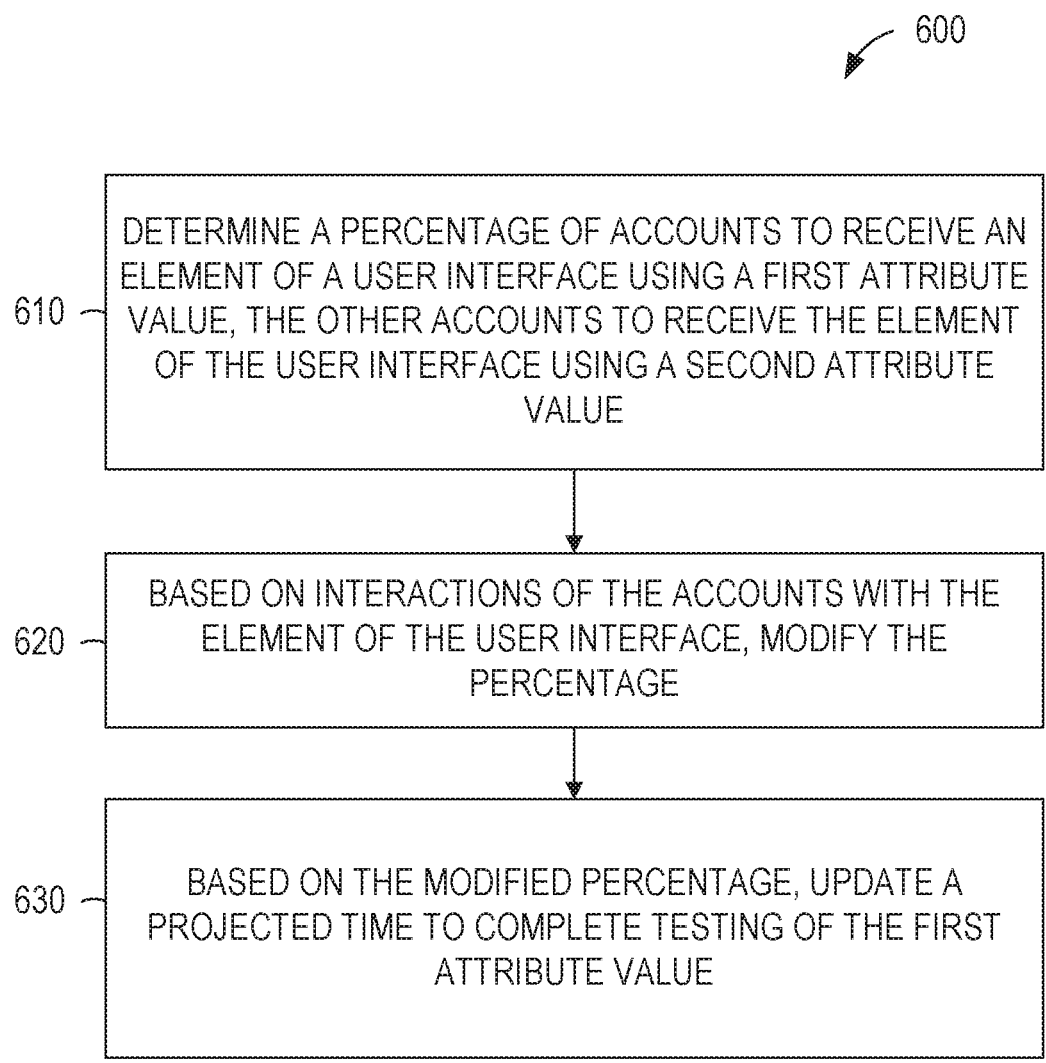
FIG. 6 is a flow diagram illustrating operations by an experimentation server in a method of projecting testing time, according to some example embodiments.

FIG. 6 is a flow diagram illustrating operations by an experimentation server in a method 600 of projecting testing time, according to some example embodiments. The method 600 includes operations 610, 620, and 630. By way of example and not limitation, the method 600 is described as being performed by the systems, modules, and databases of FIGS. 1-4.

In operation 610, the experimentation module 265 determines a percentage of accounts to receive an element of a user interface using a first attribute value, the other accounts to receive the element of the user interface using a second attribute value. For example, the range of account identifiers is divided at a threshold so that the percentage of accounts has account identifiers below the threshold. In response to a request for the user interface from an account, a version of the user interface using the first attribute is served if the account identifier of the account is below the threshold and a version of the user interface using the second attribute is served if the account identifier is not below the threshold.

In operation 620, the experimentation module 265 modifies the percentage based on interactions of the accounts with the element of the user interface. Operations 520, 530, and 540 (FIG. 5) may be used to gather the interactions for a first account using the user interface with the first attribute value and repeated for additional accounts within the percentage of accounts to receive the user interface with the first attribute value. Operations 525, 535, and 545 (FIG. 5) may be used to gather the interactions for a second account using the user interface with the second attribute value and repeated for additional accounts not within the percentage of accounts to receive the user interface with the first attribute value (or within a percentage of accounts to receive the user attribute with the second attribute value). In example embodiments with more than two attribute values being tested, similar operations are performed for additional accounts using the user interface with a third attribute value and repeated for additional accounts within a percentage of accounts to receive the user interface with the third attribute value.

For example, the threshold is modified to increase or decrease the percentage of accounts to receive the element of the user interface using the first attribute. In some example embodiments, the percentage of accounts to receive the element of the user interface using the first attribute is increased if the results associated with the first attribute, as measured using a predetermined metric, are better than the results associated with the second attribute, and the percentage of accounts to receive the element of the user interface using the first attribute is decreased if the results associated with the first attribute are worse than the results associated with the second attribute.

In some example embodiments, the modifying of the percentage in operation 620 follows analyzing a first performance of the user interface using the first attribute value (e.g., a first user interface) and a second performance of the user interface using the second attribute value (e.g., a second user interface). For example, a degree of interaction by each user of the two versions of the user interface are determined and the results aggregated to generate a performance score for each version. The modifying of the percentage may be in response to the performance scores. Thus, the determination of the attribute value to use in future presentations of the user interface to an account after adjustment of the percentage in operation 620 is indirectly based on the degree of interaction determined for each account prior to the analysis.

In operation 630, the experimentation module 265, based on the modified percentage, updates a projected time to complete testing of the first attribute value. For example, an administrator determines that the user interface with the element using the first attribute should be provided 10,000 times to determine if the first attribute is better than the second attribute. In operation 610, for instance, 10% of accounts are been selected to receive the element using the first attribute but, based on good initial results, the percentage is increased to 20% in operation 620. As a result, the time remaining to complete the testing is projected to be reduced by a factor of two. The projected time to complete testing may be based on projected usage of the user interface. For example, if the user interface was served 2,000 times before modification of the percentage in operation 620, and the projected usage is 4,000 requests for the user interface per day, the projection will be to serve 800 requests (20% of 4,000) using the first attribute each day. Accordingly, the remaining time to serve the user interface with the first attribute is projected to be 10 days, since multiplying 800 by 10 yields 8,000, the remaining number of times to provide the first attribute before completing testing. The UI module 270 causes presentation of a user interface to an administrator showing the updated projected time to completion.

Figure 7:
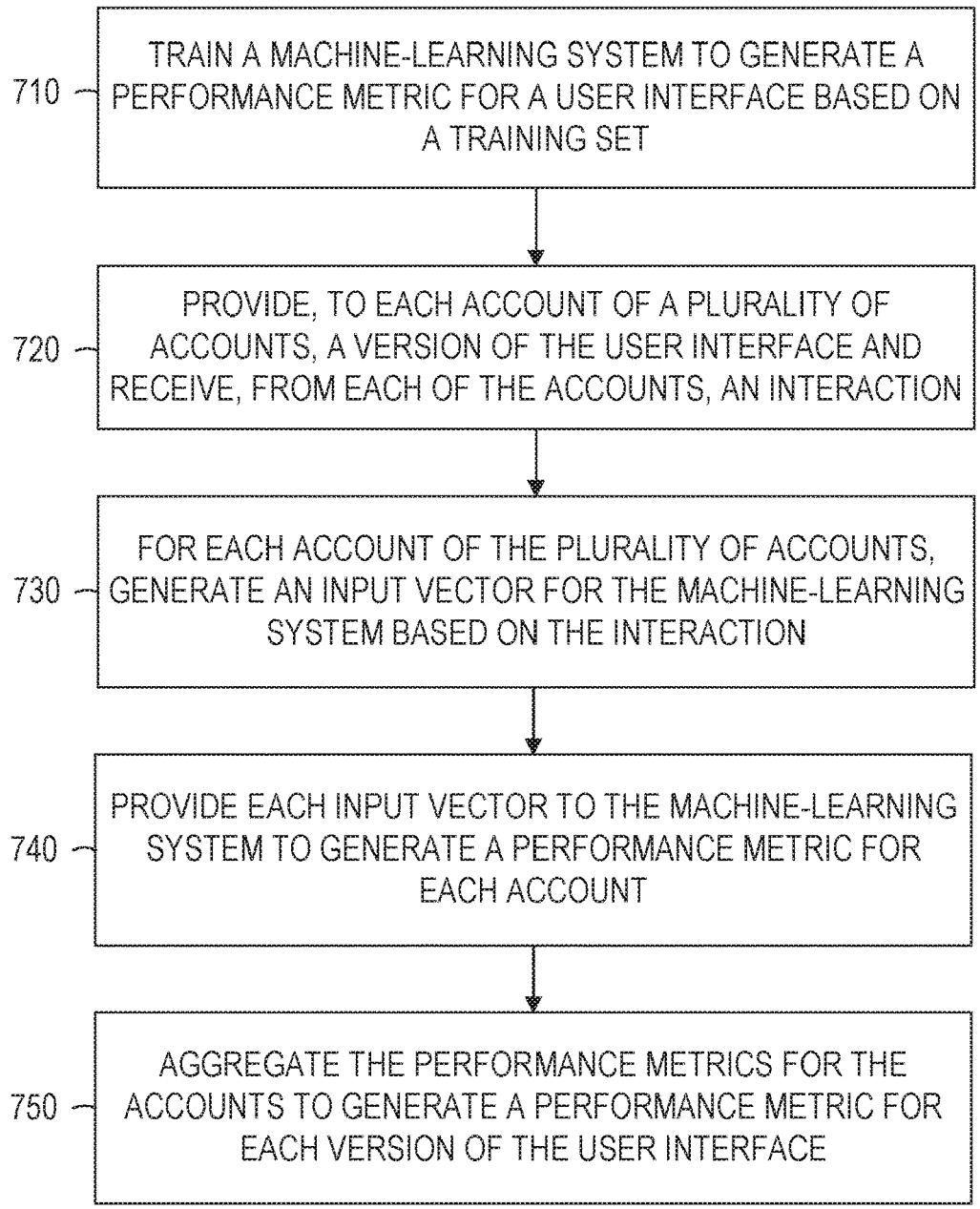
FIG. 7 is a flow diagram illustrating operations by an experimentation server in a method of evaluating versions of a user interface, according to some example embodiments.

FIG. 7 is a flow diagram illustrating operations by an experimentation server in a method 700 of evaluating versions of a user interface, according to some example embodiments. The method 700 includes operations 710, 720, 730, 740, and 750. By way of example and not limitation, the method 700 is described as being performed by the systems, modules, and databases of FIGS. 1-4.

In operation 710, the analytics module 260 trains a machine-learning system to generate a performance metric for a user interface based on a training set. For example, each element of the training set comprises a vector composed of data indicating one or more user interactions with the user interface and a performance measure that resulted from the user interactions. As a further example, the vector comprises binary values with one value for each interactive element of the user interface. The value for an interactive element may be set to zero if the user did not interact with it and one if the user did. The performance measure may be a numeric value based on a financial value of the user interaction. For example, if the user purchased an item, the performance measure is the price of the item, if the user clicked on a pay-per-click ad, the performance measure is the payment value of the ad; and if the user canceled an account, the performance measure is the (negative) expected revenue had the account been maintained. Equally, the performance measure may be a technical aspect of a machine or system of machines. For example, the performance measure may be the amount of memory, network bandwidth, processor cycles used for each user interface configuration. The performance measure may be an aggregated set of technical measurements.

In some example embodiments, the elements of the vector are automatically selected based on a received identity of the user interface (e.g., the user interface identified in operation 505 of the method 500). For example, a document object model (DOM) of a web page is traversed to identify interactive elements of the web page and the elements of the vector are automatically selected to correspond to the interactive elements of the web page.

After training, the machine-learning system generates predicted performance metrics in response to input vectors. Thus, a user interface that does not directly generate revenue can be evaluated based on its likely impact to revenue-generating activities. For example, from a front page including pictures of items for sale such that selecting a picture causes presentation of additional information for the item, some training vectors will show that selecting an item resulted in revenue from purchase of the item and some training vectors will show that selecting an item did not result in a sale, but all training vectors that do not include an item selection will show that not selecting an item resulted in no sale. Accordingly, after training, the machine-learning system will generate a higher performance measure for sessions with the front page that include selection of an item than for sessions that do not include selection of an item.

In operation 720, the UI module 270 provides, to each account of a plurality of accounts, a version of the user interface and receives, from each of the accounts, an interaction. Selection of the accounts to receive each version may be performed, as in operation 610 (FIG. 6), based on a predetermined percentage of accounts to receive each version. A bot filter may be run to remove interactions by automated systems (bots) from the plurality of accounts, preventing bots from influencing the development of the user interface.

In operation 730, the analytics module 260 generates, for each account of the plurality of accounts, an input vector for the machine-learning system based on the interaction. The input vector generated in operation 730 is of the same format as the input vectors of the training set used in operation 710. The input vector may comprise derived values in addition to or instead of values that merely indicate user interaction with user interface elements. For example, the vector may comprise an indication of whether an item was sold, an indication of whether fraud occurred, or both.

The analytics module 260, in operation 740, provides the input vectors to the machine-learning system to generate a performance metric for each account. In operation 750, the analytics module 260 aggregates the performance metrics for the accounts to generate a performance metric for each version of the user interface. For example, the performance metrics for the accounts that received a first version of the user interface (e.g., that received a first user interface with an element having a first value of an attribute) is averaged to generate the performance metric for the first version and the performance metrics for the accounts that received a second version of the user interface (e.g., that received a second user interface with the element having a second value of the attribute) is averaged to generate the performance metric for the second version. The resulting performance metrics are used in operation 620 (FIG. 6) to modify the percentage of each version to be presented thereafter.

Figure 8:
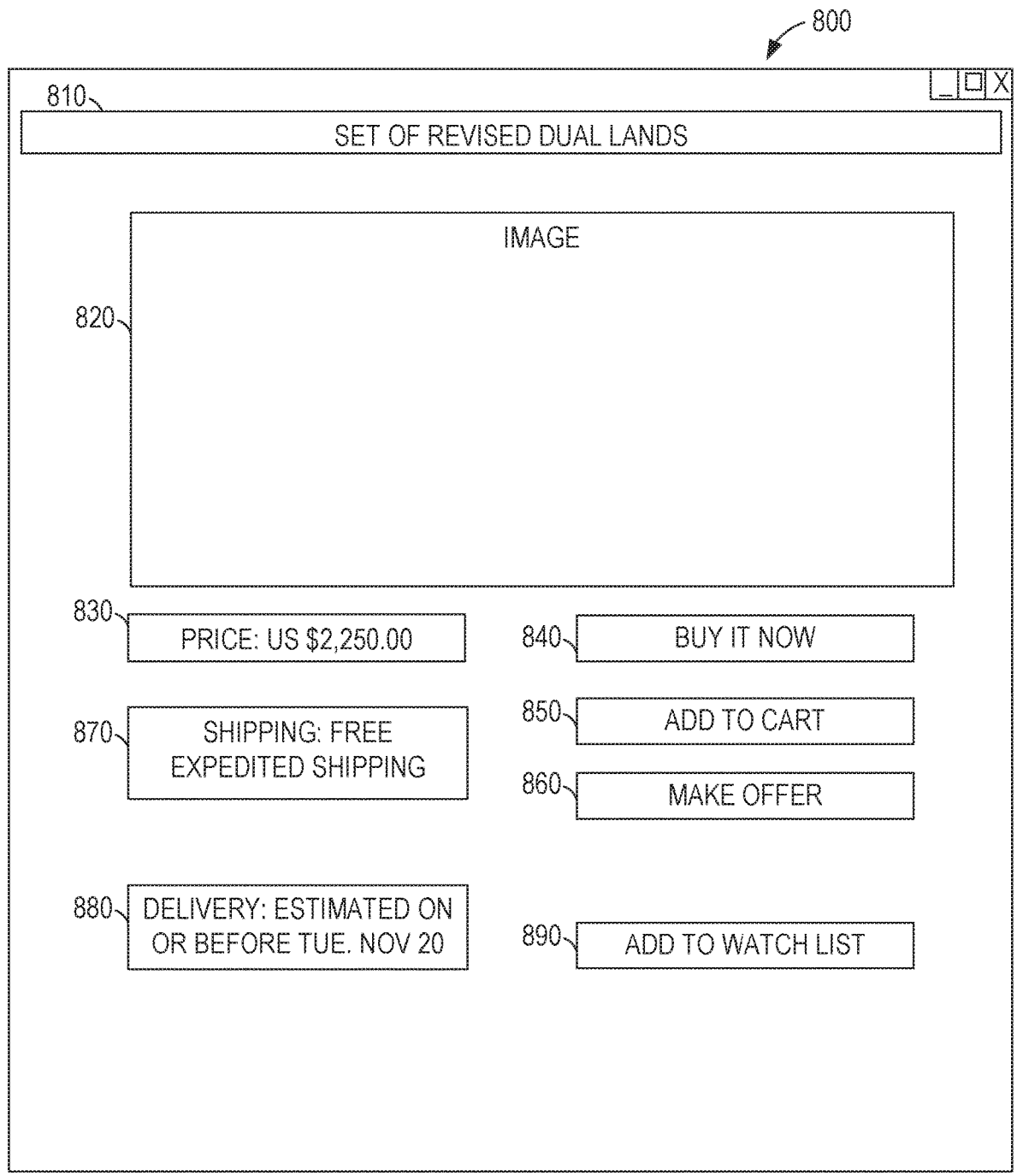
FIG. 8 is a user interface diagram showing a first example user interface.

FIG. 8 is a user interface diagram showing a first example user interface 800. The user interface 800 includes user interface elements 810, 820, 830, 840, 850, 860, 870, 880, and 890. The user interface elements 810-890 may also be referred to as a title 810, an image 820, a price 830, buttons 840, 850, 860, and 890, shipping information 870, and delivery information 880. The user interface 800 displays a listing of an item for sale. The title 810 indicates that the item for sale is a set of revised dual lands. The image 820 is a picture of the item for sale. The price 830 indicates that the price of the item is $2,250. The shipping information 870 indicates that shipping is free and will be expedited. The delivery information 880 indicates that the item is expected to be delivered by November 20$^{th}$. Each of the user interface elements 810-890 is displayed using a set of display attributes (e.g., position, color, and size).

The button 840 is operable to purchase the listed item. For example, pressing the button 840 may cause another user interface to be presented that receives credit card information and confirms the purchase. In this example, interaction with the element (the button 840) in the user interface 800 causes a further user interface to be presented and a degree of interaction (with reference to operations 540 and 545 of the method 500) with the element in the user interface 800 is based on input received via the further user interface.

The button 850 is operable to add the listed item to a shopping cart for later purchase. The button 860 is operable to cause another user interface to be presented that allows the user to enter an offered price for the item. The button 890 is operable to save the item listing to a watch list for the user.

Figure 9:
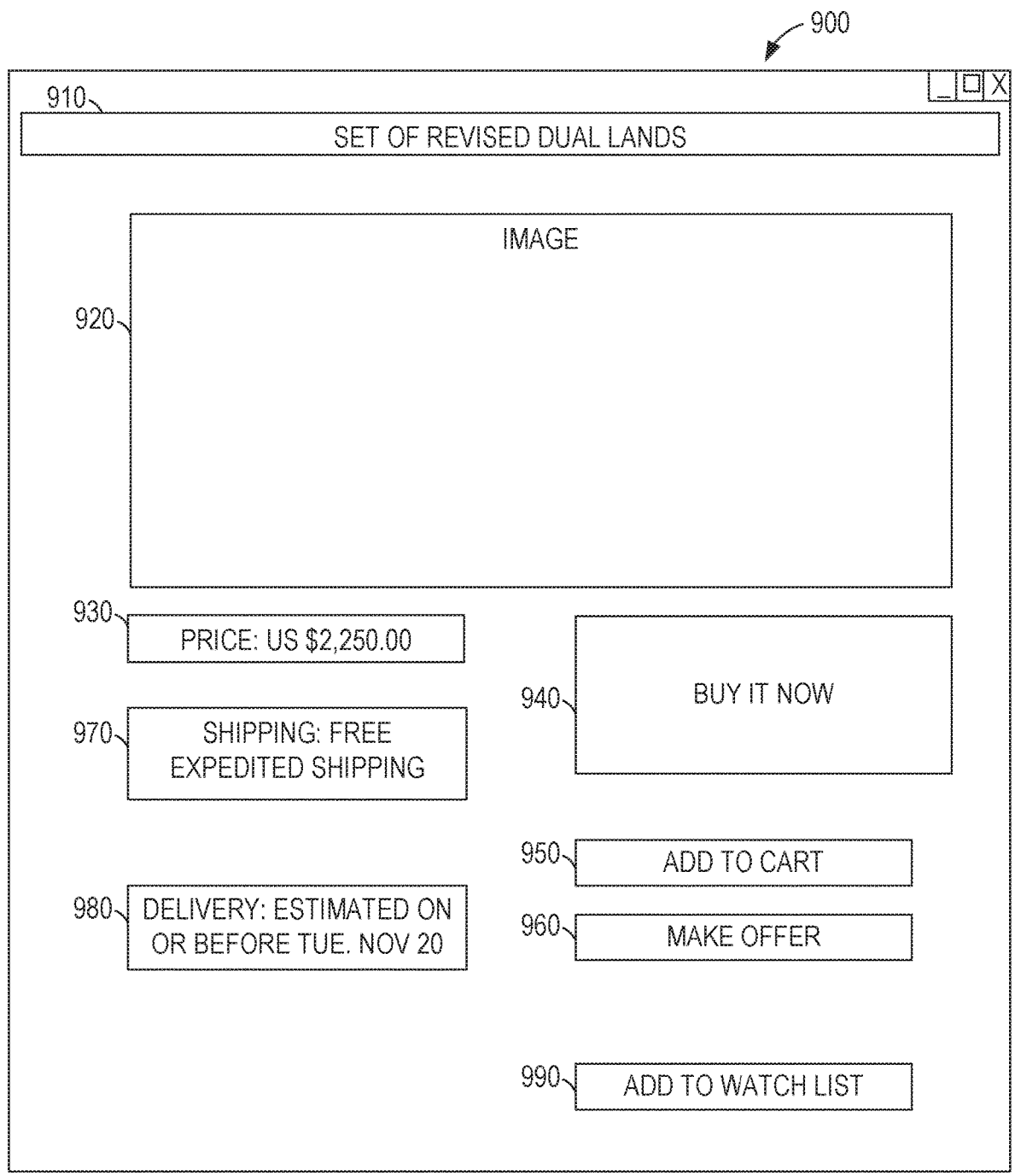
FIG. 9 is a user interface diagram showing a second example user interface related to the first example user interface but modified by an adaptive test platform according to a first experiment.

FIG. 9 is a user interface diagram showing a second example user interface 900 related to the first example user interface but modified by an adaptive test platform according to a first experiment. The user interface 900 includes user interface elements 910, 920, 930, 940, 950, 960, 970, 980, and 990. The user interface elements 910-990 may also be referred to as a title 910, an image 920, a price 930, buttons 940, 950, 960, and 990, shipping information 970, and delivery information 980.

Each of the user interface elements 910-990 corresponds to one of the user interface elements 810-890. The user interface elements 910, 920, 930, 970, and 980 are presented using the same attributes as their corresponding elements in FIG. 8. The button 940 is presented using a different size attribute than the button 840. The buttons 950, 960, and 990 are presented using different position attributes then the corresponding buttons 850, 860, and 890.

The user interfaces 800 and 900 are provided to different accounts to test the impact of the different attributes (e.g., through the use of the methods 500 or 600) according to a first experiment. In some example embodiments, only one attribute differs between the two user interfaces. In other example embodiments, multiple attributes are tested simultaneously.

Figure 10:
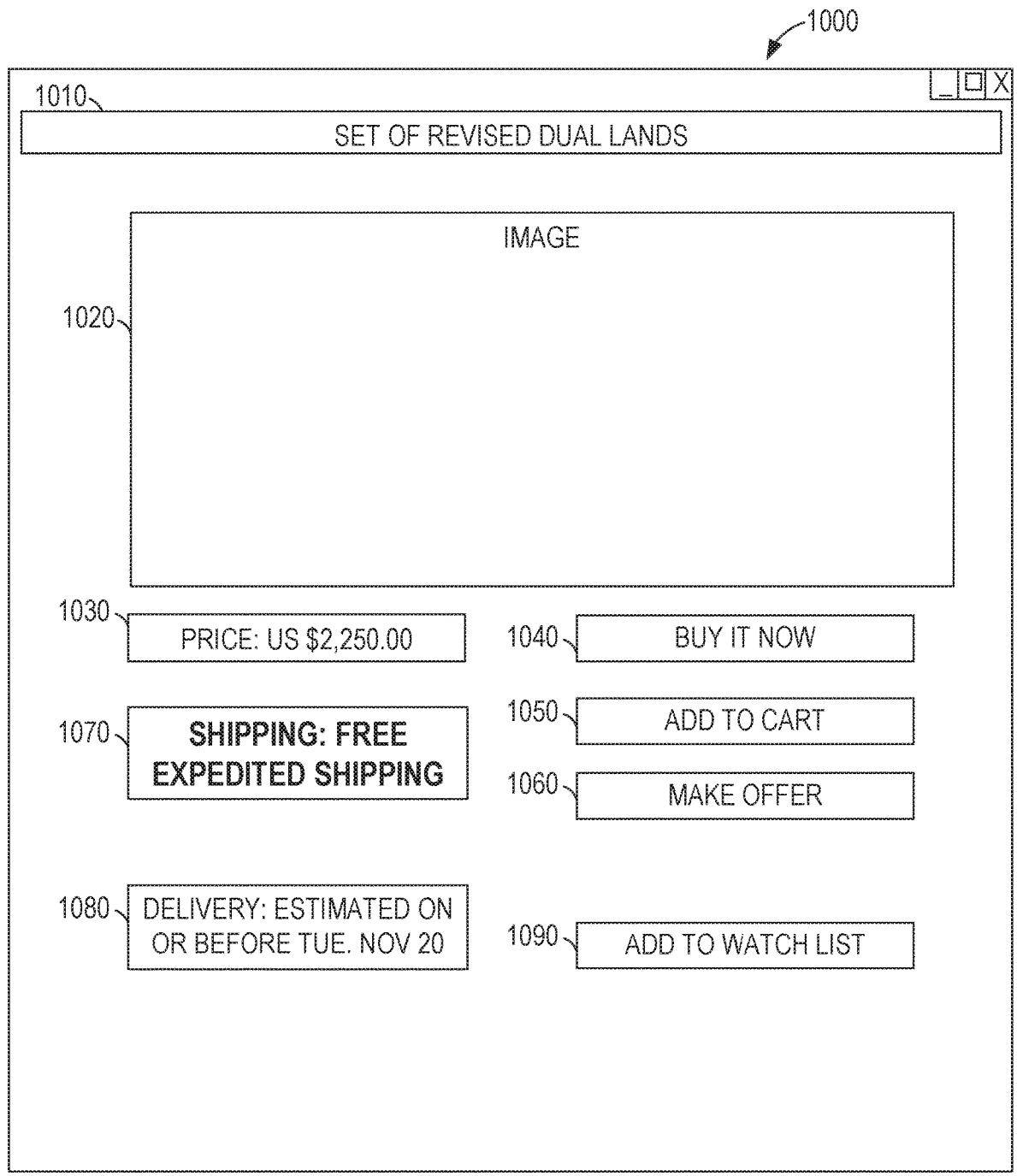
FIG. 10 is a user interface diagram showing a third example user interface related to the first example user interface but modified by an adaptive test platform according to a second experiment.

FIG. 10 is a user interface diagram showing a second example user interface 1000 related to the first example user interface but modified by an adaptive test platform according to a second experiment. The user interface 1000 includes user interface elements 1010, 1020, 1030, 1040, 1050, 1060, 1070, 1080, and 1090. The user interface elements 1010-1090 may also be referred to as a title 1010, an image 1020, a price 1030, buttons 1040, 1050, 1060, and 1090, shipping information 1070, and delivery information 1080.

Each of the user interface elements 1010-1090 corresponds to one of the user interface elements 810-890. The user interface elements 1010-1060, 1080, and 1090 are presented using the same attributes as their corresponding elements in FIG. 8. The shipping information 1070 uses a different font size attribute than the shipping information 870, 16 point instead of 14 point, and a different style, bold instead of normal.

The user interfaces 800 and 1000 are provided to different accounts to test the impact of the different attributes (e.g., through the use of the methods 500 or 600) according to a second experiment. In some example embodiments, the first and second experiments are performed simultaneously, causing the user interfaces 800, 900, and 1000 to be presented to different users to evaluate the performance of the three options.

Figure 11:
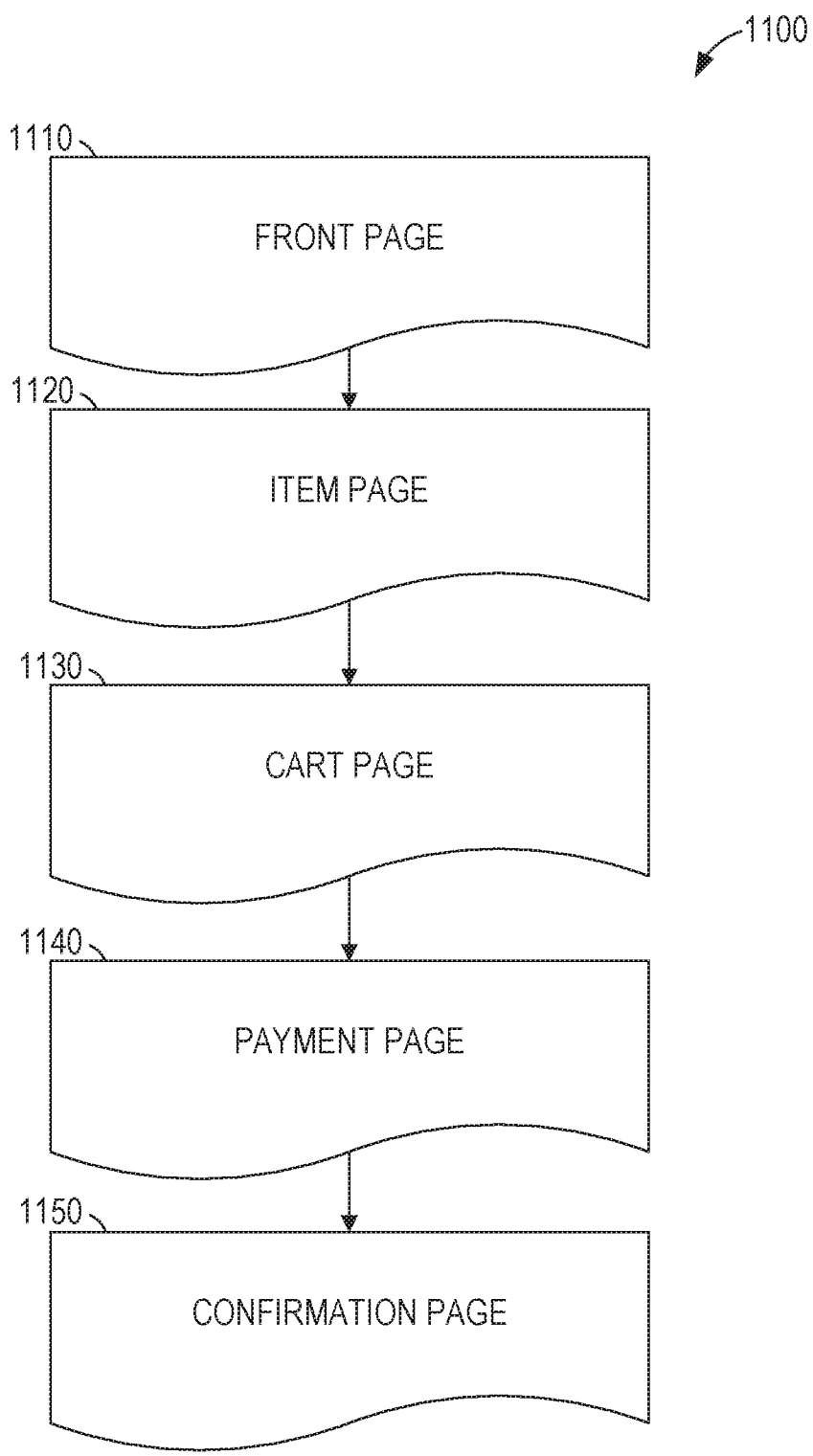
FIG. 11 is a flow diagram showing a first example user interface flow.

FIG. 11 is a flow diagram showing a first example user interface flow 1100. The first example user interface flow comprises a front page 1110, an item page 1120, a cart page 1130, a payment page 1140, and a confirmation page 1150. Each of the pages 1110-1150 is presented by the UI module 270. A user interacts with an element of the front page 1110 (e.g., by selecting a picture of an item from a set of displayed pictures) and receives in response the item page 1120 (e.g., the user interface 700), containing information about an item for sale. The relationship between the element and the item page 1120 is a functional attribute of the element.

In response to interaction with an element (e.g., the button 740) of the item page 1120, the cart page 1130 is displayed, showing information for a shopping cart for the user, the shopping cart including the item of the item page 1120. In response to interaction with an element of the cart page 1130, the payment page 1140 is displayed, allowing the user to enter or confirm payment information. In response to receiving the payment information or confirmation to proceed with the transaction, the confirmation page 1150 is displayed with an information message confirming that the transaction was successful.

Figure 12:
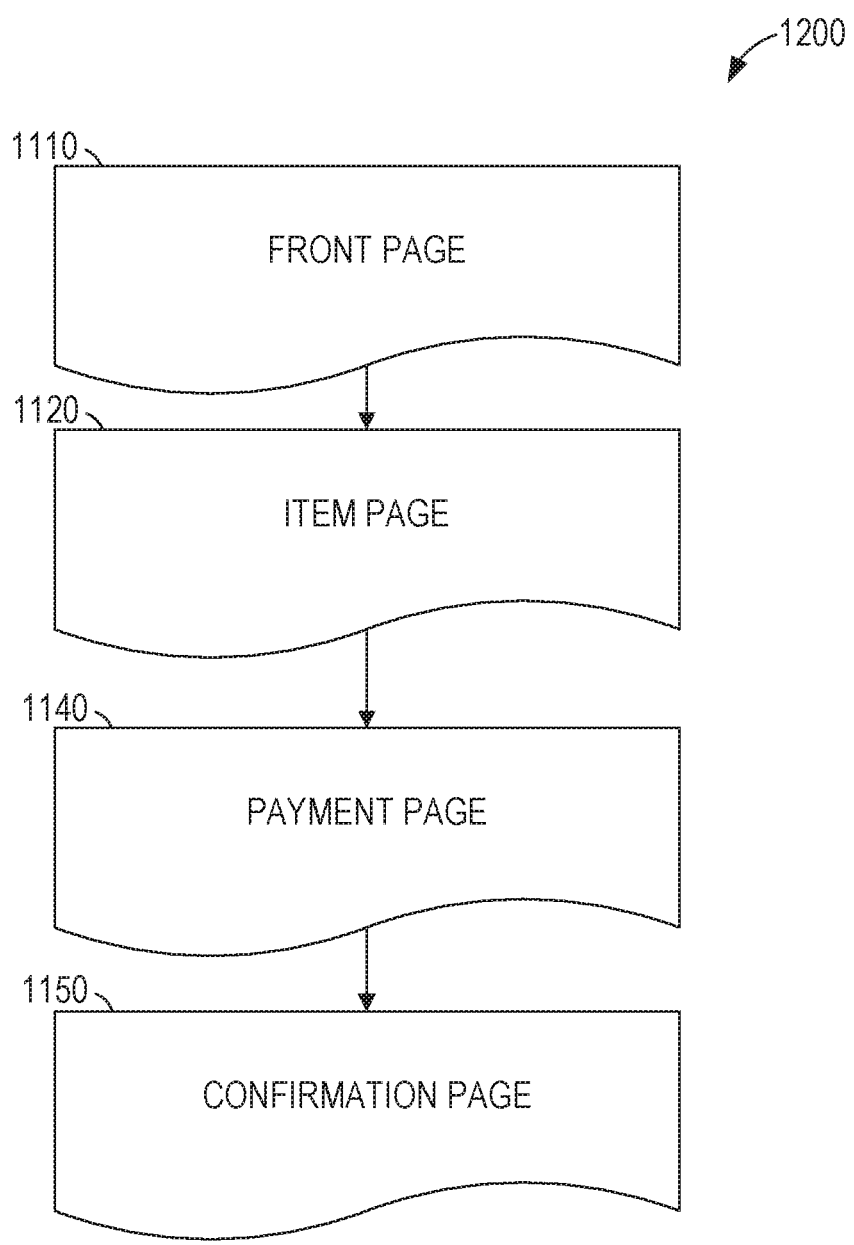
FIG. 12 is a flow diagram showing a second example user interface flow related to the first example user interface flow but modified by an adaptive test platform according to a third experiment.

FIG. 12 is a flow diagram showing a second example user interface flow 1200 related to the first example user interface flow but modified by an adaptive test platform according to a third experiment. The second example user interface flow comprises the front page 1110, the item page 1120, the payment page 1140, and the confirmation page 1150. By comparison with the first example user interface flow 1000, the cart page 1030 is no longer displayed. Instead, operation of the element that previously caused the cart page 1130 to be displayed now causes the payment page 1140 to be displayed. Thus, the functional attribute of an element of the item page 1120 is modified by the third experiment.

Figure 13:
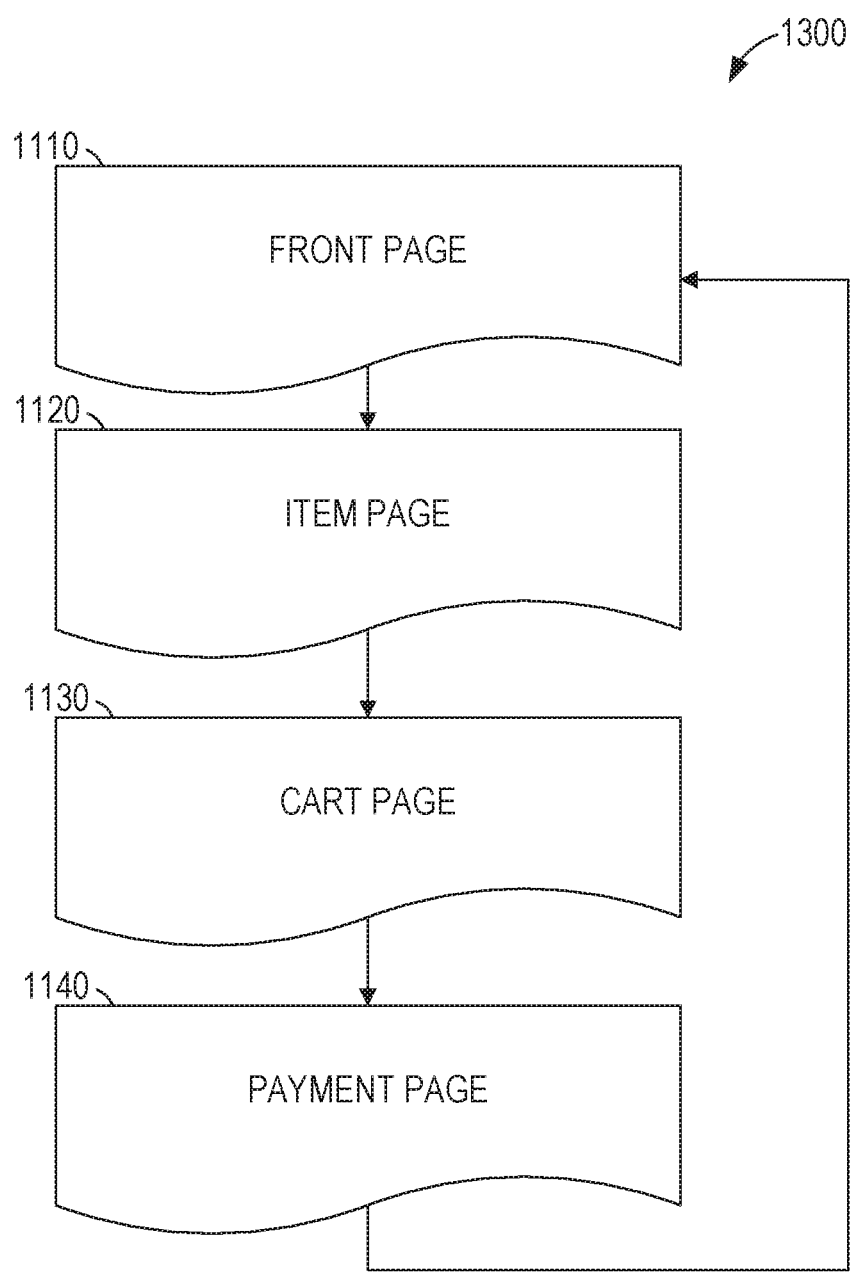
FIG. 13 is a flow diagram showing a third example user interface flow related to the first example user interface flow but modified by an adaptive test platform according to a fourth experiment.

FIG. 13 is a flow diagram showing a second example user interface flow 1300 related to the first example user interface flow but modified by an adaptive test platform according to a fourth experiment. The second example user interface flow comprises the front page 1110, the item page 1120, the cart page 1130, and the payment page 1140. By comparison with the first example user interface flow 1000, the confirmation page 1150 is no longer displayed. Instead, operation of the element that previously caused the confirmation page 1150 to be displayed instead returns the user to the front page 1110. Thus, the functional attributes of an element of the payment page 1140 is modified by the fourth experiment.

The methods and techniques disclosed herein provide for automatic improvements to user interfaces. In prior-art systems, an administrator manually determined the options to be tested. Additionally, the percentage of accounts to receive each option was fixed throughout the testing. By contrast, by using the systems and methods described herein, automated variation of attributes of user interface elements is enabled, allowing for continuous automatic improvement of user interfaces. Furthermore, the percentage of accounts to receive a version of the user interface being tested can automatically and dynamically change, reducing the amount of time before a user interface variation can be confirmed to be an improvement and be deployed to all users.

When these effects are considered in aggregate, one or more of the methodologies described herein may obviate a need for certain efforts or resources that otherwise would be involved in testing versions of user interfaces. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for executing a randomized controlled trial, the method comprising:
   receiving an identity of an element of a user interface;
   receiving an attribute of the element of the user interface;
   by one or more processors, automatically determining a first value and a second value for the attribute of the element of the user interface;
   automatically generating a first user interface, the first user interface having the attribute of the element set at the first value, the first user interface defining a first test input to the randomized controlled trial;
   automatically generating a second user interface, the second user interface having the attribute of the element set at the second value, the second user interface defining a second test input to the randomized controlled trial;
   providing the first user interface to a first percentage of users, the first user interface having the attribute of the element set at the first value;

providing the second user interface to a second percentage of users, the second user interface having the attribute of the element set at the second value;

based on interactions with the element in the first user interface, determining a first set of test results;

based on interactions with the element in the second user interface, determining a second set of test results;

based on the first and second sets of test results, automatically adapting the first and second percentages;

providing the first and second user interfaces to the adapted first and second percentages of users;

generating iteratively adapted first and second percentages as additional test results are received; and providing the first and second user interfaces to the iteratively adapted first and second percentages of users.

2. The method of claim 1, wherein the attribute of the element is a color of the element.

3. The method of claim 1, wherein the attribute of the element is text content of the element.

4. The method of claim 1, wherein the attribute of the element is a location of the element.

5. The method of claim 1, wherein the user interface is part of a web site.

6. The method of claim 1, wherein the user interface is displayed on a wearable computer.

7. The method of claim 1, wherein the user interface is a voice interface.

8. The method of claim 1, further comprising:
determining an updated amount of time for testing the first user interface and the second user interface based on the adapted first and second percentages.

9. The method of claim 1, wherein:
interaction with the element in the first user interface causes a further user interface to be presented; and
the interactions with the element in the first user interface are based on input received via the further user interface.

10. The method of claim 1, further comprising analyzing a first performance of the first user interface and a second performance of the second user interface and presenting a third user interface based on the analyzing.

11. The method of claim 1, wherein the determining of the first set of test results comprises generating a vector and providing the vector as input to a machine learning system.

12. The method of claim 11, wherein the vector comprises an indication of whether an item was sold.

13. The method of claim 11, wherein the vector comprises an indication of whether fraud occurred.

14. The method of claim 11, wherein elements of the vector are automatically selected based on the received identity of the user interface.

15. A system comprising:
a memory that stores instructions; and
one or more processors configured by the instructions to perform operations comprising:
receiving an identity of an element of a user interface;
receiving an attribute of the element of the user interface;
automatically determining a first value and a second value for the attribute of the element of the user interface;
automatically generating a first user interface, the first user interface having the attribute of the element set at the first value, the first user interface defining a first test input to a randomized controlled trial;
automatically generating a second user interface, the second user interface having the attribute of the element set at the second value, the second user interface defining a second test input to the randomized controlled trial;
providing the first user interface to a first percentage of users, the first user interface having the attribute of the element set at the first value;
providing the second user interface to a second percentage of users, the second user interface having the attribute of the element set at the second value;
based on interactions with the element in the first user interface, determining a first set of test results;
based on interactions with the element in the second user interface, determining a second set of test results;
based on the first and second sets of test results, automatically adapting the first and second percentages;
providing the first and second user interfaces to the adapted first and second percentages of users;
generating iteratively adapted first and second percentages as additional test results are received; and
providing the first and second user interfaces to the iteratively adapted first and second percentages of users.

16. The system of claim 15, wherein the attribute of the element is a color of the element.

17. The system of claim 15, wherein the attribute of the element is text content of the element.

18. A non-transitory machine-storage medium that stores instructions that, when executed by one or more processors, cause the one or more processors to perform operations comprising:
receiving an identity of an element of a user interface;
receiving an attribute of the element of the user interface;
automatically determining a first value and a second value for the attribute of the element of the user interface;
automatically generating a first user interface, the first user interface having the attribute of the element set at the first value, the first user interface defining a first test input to a randomized controlled trial;
automatically generating a second user interface, the second user interface having the attribute of the element set at the second value, the second user interface defining a second test input to the randomized controlled trial;
providing the first user interface to a first percentage of users, the first user interface having the attribute of the element set at the first value;
providing the second user interface to a second percentage of users, the second user interface having the attribute of the element set at the second value;
based on interactions with the element in the first user interface, determining a first set of test results;
based on interactions with the element in the second user interface, determining a second set of test results;
based on the first and second sets of test results, automatically adapting the first and second percentages;
providing the first and second user interfaces to the adapted first and second percentages of users;
generating iteratively adapted first and second percentages as additional test results are received; and
providing the first and second user interfaces to the iteratively adapted first and second percentages of users.

19. The non-transitory machine-storage medium of claim 18, wherein the attribute of the element is a color of the element.

20. The non-transitory machine-storage medium of claim 18, wherein the attribute of the element is text content of the element.

* * * * *